Oct. 8, 1929.  W. L. CLOUSE  1,730,806
AUTOMATIC STOP
Filed Nov. 13, 1926  4 Sheets-Sheet 1
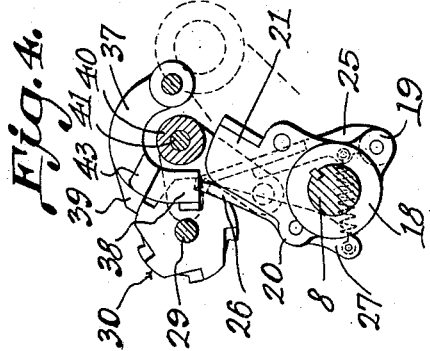
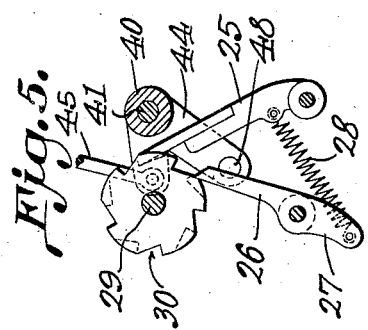
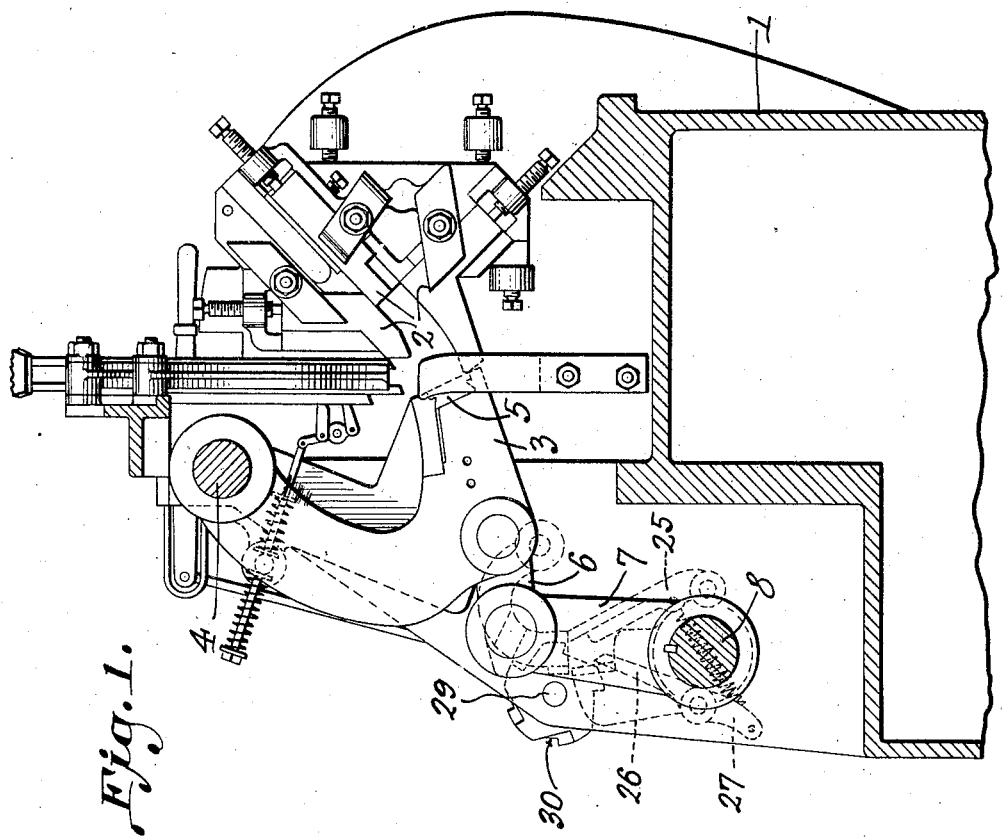
Inventor
William L. Clouse
By C. A. Snow & Co.
Attorneys

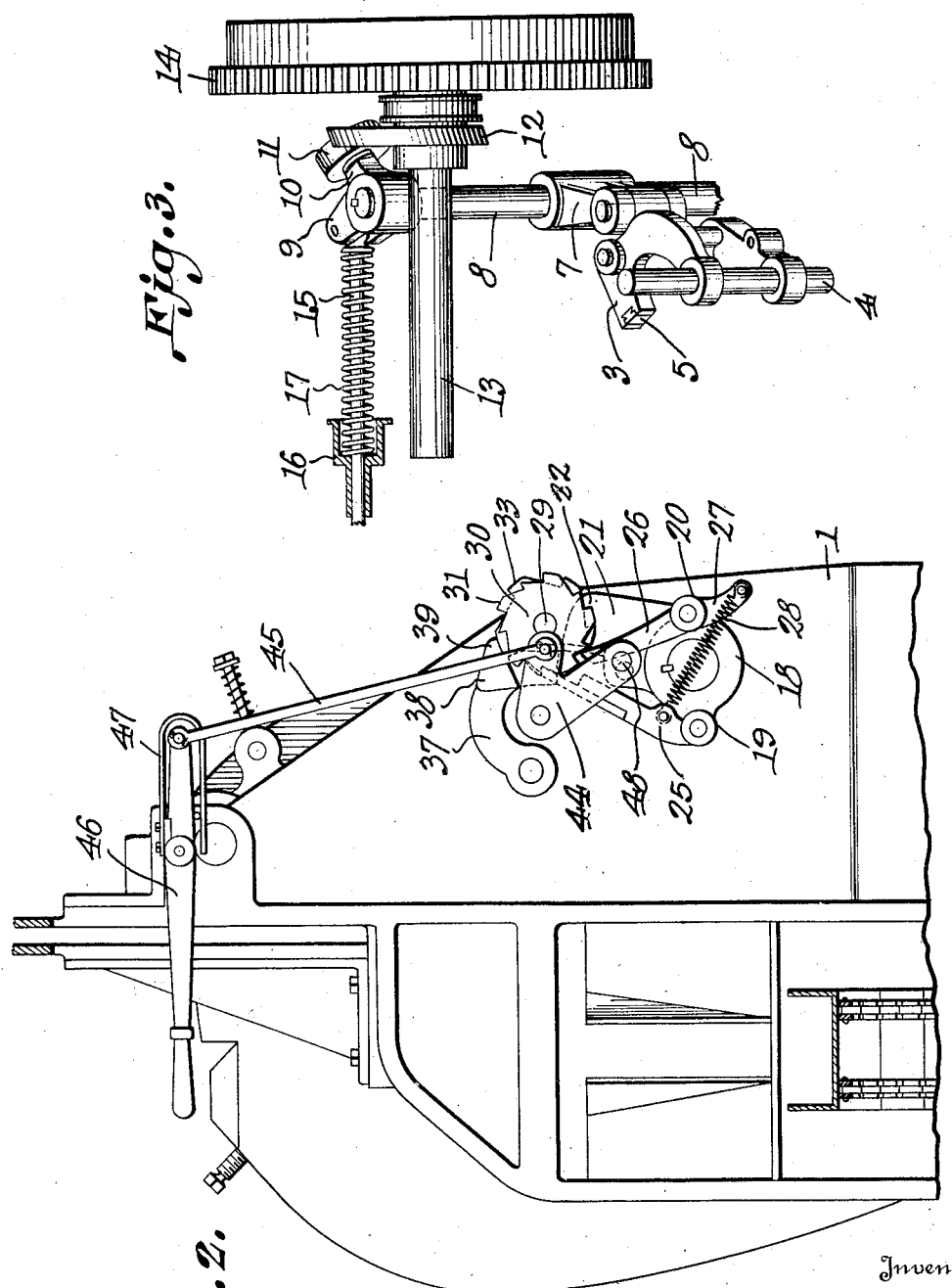

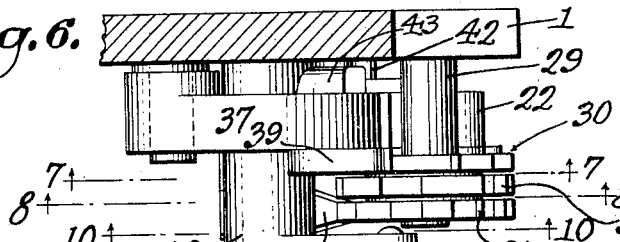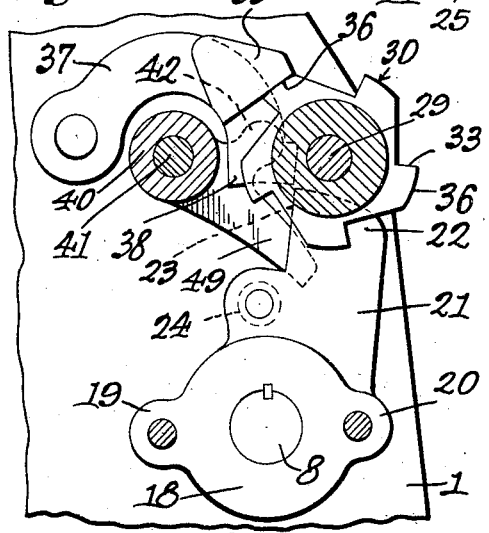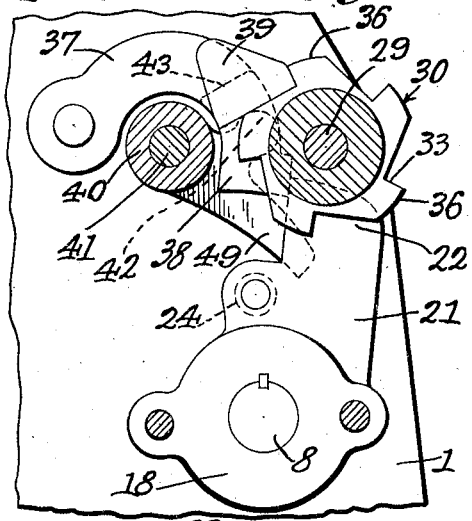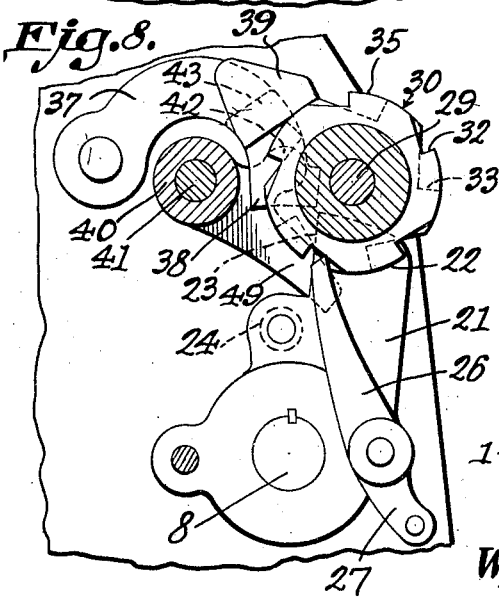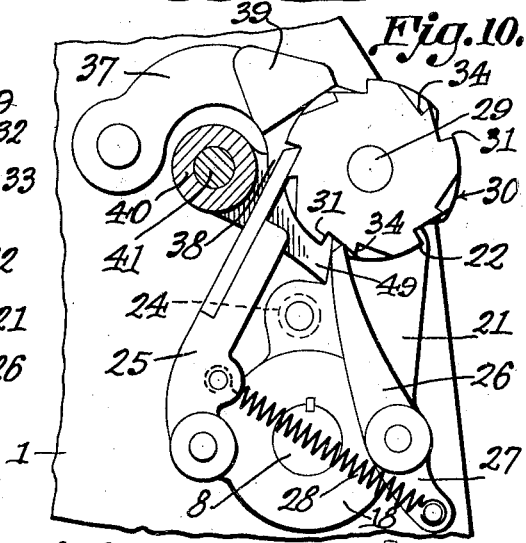

Oct. 8, 1929.   W. L. CLOUSE   1,730,806
AUTOMATIC STOP
Filed Nov. 13, 1926   4 Sheets-Sheet 4

William L. Clouse Inventor
By C. A. Snow & Co.
Attorneys.

Patented Oct. 8, 1929

1,730,806

UNITED STATES PATENT OFFICE

WILLIAM L. CLOUSE, OF TIFFIN, OHIO, ASSIGNOR TO THE NATIONAL MACHINERY CO., OF TIFFIN, OHIO

AUTOMATIC STOP

Application filed November 13, 1926. Serial No. 148,290.

This invention relates to an automatic stop for use in connection with bolt trimming machines of that type utilizing stationary trimming dies and a movable trimming die, the movable die operating with a jaw to feed untrimmed bolts to position between the dies. It is essential that some means be provided for automatically stopping the operation of the movable jaw should an obstruction get into the path thereof and tend to clog the machine.

It is an object of the present invention to provide simple and efficient means whereby, should the movable die and jaw fail to reach the limit of its feeding or advancing movement, a latch mechanism would be released automatically to lock the jaw and movable die against further advancing movement after it has been retracted to its full open or starting position.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a view partly in elevation and partly in section of a portion of a bolt trimming machine having the present improvements combined therewith.

Figure 2 is an elevation of the latch for stop mechanism viewed from the side of the machine opposite to that shown in Figure 1.

Figure 3 is a perspective view, partly in section, of the mechanism for actuating the movable jaw of the bolt and the stop mechanism.

Figure 4 is an elevation of the latch mechanism showing the parts in the positions assumed thereby when the movable jaw of the machine reaches the limit of its advance movement.

Figure 5 is a view of a portion of the latch mechanism showing the operating pawls and the ratchet wheel in the relative positions assumed thereby when the parts are arranged as in Figure 4 with the movable jaw at the limit of its advancing or feeding movement.

Figure 6 is a top plan view of the latch mechanism.

Figure 7 is a section on line 7—7, Figure 6.

Figure 8 is a section on line 8—8, Figure 6.

Figure 9 is a view similar to Figure 7 showing the latch in holding position.

Figure 10 is a section on line 10—10, Figure 6.

Figure 11:
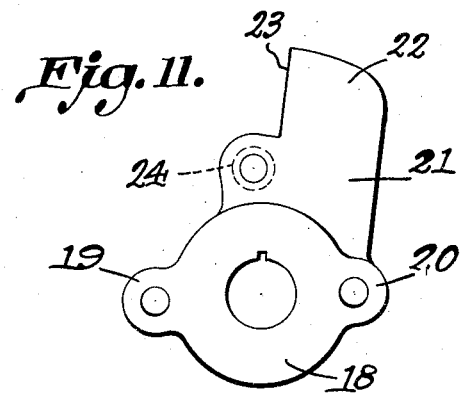
Figure 11 is a side elevation of the stop tongue.
Figure 12:
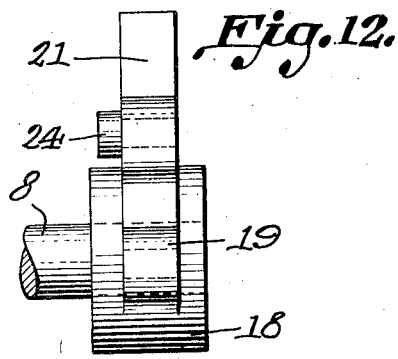
Figure 12 is an edge view thereof.
Figure 13:
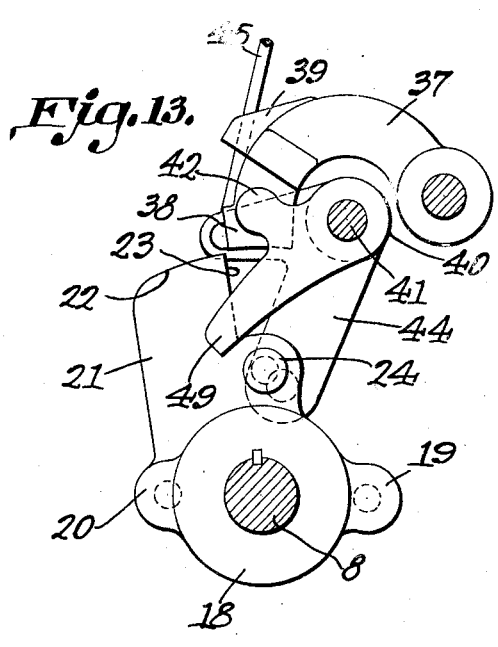
Figure 13 is a detail view of the latch and a part of its releasing means.
Figure 15:
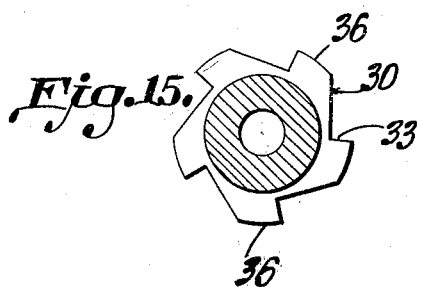
Figure 15 is a detail of one of the notched members of the ratchet.
Figure 16:
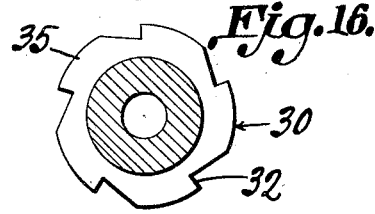
Figures 16 and 17 are detail views of other notched members of the ratchet.
Figure 14:
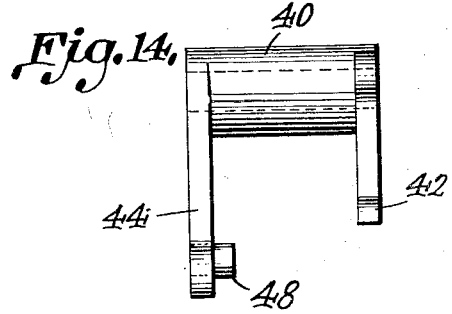
Figure 14 is a detail view of a portion of the latch releasing mechanism.
Figure 17:
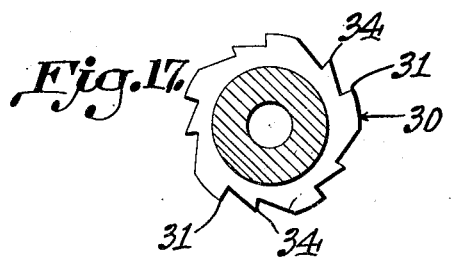

Referring to the figures by characters of reference 1 designates a portion of the main structure of the machine on which are arranged trimming dies indicated generally at 2 for shearing off surplus metal or flashings usually produced on bolt heads during the heading operation. A jaw 3 is mounted to swing about a center 4 and also carries a die 5 which cooperates with the other dies to trim a bolt head and also constitutes a means for feeding an untrimmed bolt head to position between the dies. Jaw 3 is adapted to swing or oscillate through the medium of a toggle comprising a link 6 and an arm 7, this arm being extended from a shaft 8 suitably journaled on the structure 1. This shaft has arms 9 and 10 radiating therefrom, the arm 10 carrying a roller 11 which engages the periphery of a cam 12 secured to a shaft 13. This shaft is journaled on the structure 1 and has a gear 14 thereon whereby it can be rotated by any desired mechanism. Extending from arm 9 is a rod 15 slidable within a guide 16 and mounted on this rod is a spring 17 thrusting at one end against the guide 16 and at its other end against the arm 10. Thus the spring, which is constantly under compression serves to hold the roller 11 pressed yieldingly against the periphery of cam 12. The action of the spring is such as to rotate shaft 8 and cause the jaw 3 to advance toward the dies 2, retraction of the jaw being effected by pressure of the cam 12 against the roller 11. Obviously, therefore, should an obstruction become seated in the path of jaw 3 so as to interfere with its movement toward the dies 2, the relative movement resulting from the continuous rotation of shaft 13 will be compensated for by the resiliency of the spring.

In order that the operation of the jaw may be stopped automatically after its feeding motion has been interrupted by an obstruction, an automatic mechanism for this purpose has been provided. This mechanism includes a collar 18 secured to the shaft 8 and provided, at diametrically opposed points with projecting ears 19 and 20. A tongue 21 is extended from the periphery of the collar 18 and has a rounded outer end indicated at 22 terminating in a straight radial shoulder 23. A laterally projecting stop pin 24 is carried by this tongue. Pivotally connected to the ear 19 of collar 18 is a pawl 25 and another pawl 26 is pivotally connected to the ear 20. Pawl 26 has a finger 27 extending beyond the pivot thereof and a spring 28 yieldingly connects this finger to pawl 25 to press the free ends of both pawls in one direction.

A stud 29 is carried by the machine close to but out of the path of the tongue 21 and mounted for rotation on this stud is a ratchet 30 having two annular series of teeth indicated at 31 and 32 respectively and an anular series of notches 33. The teeth 31 are spaced apart such a distance that when shaft 8 is rotated to bring jaw 3 from one extreme position to another the pawl 25 which has dropped into engagement with one of the teeth 31, will rotate the ratchet a distance equal to the distance between two adjoining teeth 31. Consequently when the jaw 3 is moved back to its normal or starting position and the pawl 25 is also moved back to starting position, said pawl will be brought exactly to the point where it will drop into engagement with another tooth 31. Between the teeth 31 are smaller teeth 34 designed for engagement by the pawl 25 should the pawl start its forward or advancing movement before engaging one of the teeth 31.

The teeth 32 are spaced apart the same distance as the teeth 31 and the edges of these teeth 32 and 31 constantly aline. The periphery of the ratchet gear teeth 32 is concentric with the center thereof for a distance equal to that between each tooth 31 and the next adjoining tooth 34. Thus this concentric portion, indicated at 35 in Figure 8 serves to bridge the space back of the adjacent tooth 34.

As before explained the pawl 25 acts upon the teeth 31 and 34. Pawl 26 is offset laterally relative to pawl 25 and acts solely upon the teeth 32. The pawls are adapted alternately to engage their teeth so that during back and forth rotation of shaft 8 the ratchet will be intermittently rotated in one direction.

The inner series of notches 33 are arranged approximately midway between the teeth 32 and concentric peripheral portions 36 are provided between the notches 33 and partly bridge the spaces between the teeth 32. The relative arrangement of the teeth can be clearly determined by comparing Figures 7, 8 and 10.

Pivotally mounted adjacent the ratchet wheel is a latch 37 having a head 38 which, when in normal or lowermost position, is supported in the path of the shoulder 23 of tongue 21. On one side of this latch is a shoulder 39 which bears on the peripheral notched portion 33 of the ratchet. As long as this shoulder is bearing on the arcuate peripheral portion of the ratchet the head 38 will be supported out of the path of the tongue 21 and said tongue can oscillate freely. If, however, the shoulder 39 drops into engagement with one of the notches 33, the latch would also drop and its head would be engaged by shoulder 23 so as thereby to prevent further actuation of shaft 8 and of the movable jaw.

The operation of this structure is as follows:

As shaft 8 is rotated in one direction by the cooperation of cam 12 with roller 11 the jaw 3 is retracted from trimming position and during continued rotation of the cam, spring 17 actuates shaft 8 to advance the jaw to trimming position. Tongue 21 oscillates with the shaft 8 and each time the jaw advances the pawl 25 thrusts against one of the teeth 31 and rotates the ratchet the maximum distance, this rotation continuing until the jaw 3 reaches the normal limit of its advance. During this rotation of the ratchet the notches 33 move under shoulder 39 on latch 37 and are brought to such positions that the latch will be supported by the periphery of the ratchet with the head 38 out of the path of the tongue 21. As the jaw moves back from trimming position pawl 25 will slip over the adjacent teeth 31 and 34 while pawl 26 will thrust against one of its teeth 32 and continue the rotation of the ratchet. When the jaw reaches its retracted position under the action of the cam 12 and roller 11 the ratchet will have been moved to such a position that the latch is still supported by the periphery of the ratchet with its head 38 out of the path of tongue 21. Thus it will be seen that during the back and forth normal movement of the jaw 3, the latch 37 will be supported inactive and the various parts will rotate freely.

If by any chance, an unyielding obstruction should get into the path of jaw 3 while it is being advanced by the compressed spring 17 the rotation of shaft 8 would stop and, therefore, rotation of the ratchet by the pawl 26 would cease before the ratchet had been given its maximum rotation. The parts would therefore remain stationary until the cam 12 begins to thrust against roller 11. Rotation of shaft 8 thus produced will cause pawl 25 to impart a partial rotation to the ratchet but such rotation will cease before pawl 25 can be reset in engagement with another tooth 31. Consequently after the jaw has been completely retracted by pressure of cam 12 on roller 11 and begins to move or advance under the action of spring 17 pawl 26 will engage tooth 34 instead of tooth 31 and only give a partial rotation to the ratchet, this rotation being sufficient to bring one of the series of notches 33 directly under shoulder 39. Consequently when the parts come to rest latch 37 will drop and its head 38 will assume a position in the path of shoulder 23. Rotation of the shaft 8 by spring 17 is thus prevented and said spring is held under compression with the jaw 3 retracted and the roller 11 outside the path of rotation of the cam 12. After the obstruction has been removed from the path of jaw 3 the latch can be shifted to release the mechanism after which the operation will continue as heretofore. For the purpose of releasing the latch a sleeve 40 is mounted for rotation on a stud 41 and carries a lifting finger 42. This finger works below a laterally extending ear 43 on one side of latch 37 and is normally spaced from said ear so as not to interfere with the dropping of the latch 37. Rotatable with the finger 42 is a bell crank 44 one arm of which is connected by a rod 45 to a starting lever 46, this lever being held normally in a predetermined position by a looped spring 47 extending around the end thereof. One arm of bell crank 44 is adapted to work close to the pawl 25 and has a laterally extending pin 48 movable against said pawl when the handle of lever 46 is raised. A finger 49 is extended from the sleeve 40 close to the finger 42 and extends into the path of the pin 24 on tongue 21. By shifting lever 46 in one direction against the action of its spring the finger 42 will thrust upwardly against the ear 43 and lift the latch 37 out of the path of tongue 21. At the same time finger 49 will move away from pin 24 and permit free movement of the tongue 21. Pin 48 on the bell crank will move away from the pawl 25 and the parts will then be free to operate.

While this automatic stop is designed primarily for use in connection with a bolt trimming machine it is to be understood that the same can also be used in connection with any type of machine into which bolts are fed automatically. For example, this stop can be used to advantage in connection with roll thread machines, cut die threaders, bolt pointers, bolt nutting machines, etc.

What I claim is:

1. The combination with a movable jaw, resilient means for moving the jaw in one direction and means for positively moving the jaw in the opposite direction, of a latch, means intermittently actuated by the movement of the jaw for supporting the latch in active position, a member movable synchronously with the jaw, and means for releasing the latch into the path of said member when the movement of the jaw in one direction is stopped at any point.

2. The combination with a movable jaw, unconnected means for moving the jaw positively in one direction, and resilient means for moving the jaw in the opposite direction, of a member mounted for back and forth movement synchronously with the jaw, a latch, means operated by the movement of the jaw to the normal limit of its movement for supporting the latch, and means for releasing the latch into the path of said member when the advance of the jaw to normal extreme position is stopped at any point, thereby to prevent repeated advance movements of the jaw.

3. The combination with a movable jaw, resilient means for moving the jaw in one direction, and means for positively moving the jaw in the opposite direction, of a member movable synchronously with the jaw, a latch, means controlled by the movement of the jaw to its normal extreme advanced position for supporting the latch away from the member, and means for releasing the latch for movement into the path of said member when the advance movement of the jaw is stopped at any point.

4. The combination with a movable jaw, means for advancing the jaw and means for retracting the jaw, of a member mounted for back and forth movement during the corresponding movement of the jaw, a latch, means controlled by the movement of the jaw to its normal extreme advanced position for holding the latch inactive, and means for releasing the latch into the path of said member when the advance of the jaw is stopped at any point, thereby to prevent repeated advance movements of the jaw.

5. The combination with a movable jaw, means for advancing the jaw and means for retracting the jaw, of a member movable synchronously with the jaw, a latch, means controlled by the movement of the jaw to its normal extreme advanced position for supporting the latch away from the member, means for releasing the latch for movement into the path of said member when the advance movement of the jaw is stopped at any point, and means under the control of an operator for disengaging the latch from said member.

6. The combination with a movable jaw, resilient means for advancing the jaw, and separable means for positively retracting the jaw, of a member movable synchronously with the jaw, a latch, a rotatable ratchet member normally supporting the latch out of the path of the movable member, said supporting member having spaced peripheral notches, means operated by the movement of the jaw to and from normal extreme advanced position for intermittently rotating said supporting means to stop the peripheral notches at points remote from the supported latch, and means controlled by the movement of the jaw after interference with its advance movement, for rotating said supporting means to position a notch below and release the latch, thereby to stop the first named movable member and the jaw.

7. The combination with a movable jaw, resilient means for advancing the jaw and separable means for positively retracting the jaw, of a member movable synchronously with the jaw, a latch, a ratchet having a notched peripheral portion normally engage and supporting the latch, there being separate annular series of teeth upon the ratchet, the teeth of one series being closer together than the teeth of the other series, separate pawls engaging the respective series of ratchet teeth and acuated by the movement of the jaw to intermittently rotate the ratchet in one direction equal distances during the normal advance movement of the jaw thereby to position the notches in the periphery of the ratchet at points remote from the latch, one of said pawls cooperating with one of its teeth of the ratchet to impart less than normal movement to the ratchet when the advance movement of the jaw is interfered with, thereby to position a notch in the ratchet in such relation to the latch as to release the latch into engagement with the movable member.

In testimony that I claim the foregoing as my own, I have hereto affixed my signature.

WILLIAM L. CLOUSE.